Sept. 27, 1949.     D. VITROGAN     2,482,817
RECTIFIER
Filed May 17, 1945

INVENTOR.
DAVID VITROGAN
BY
ATTORNEY

Patented Sept. 27, 1949

2,482,817

UNITED STATES PATENT OFFICE 2,482,817

RECTIFIER

David Vitrogan, Brooklyn, N. Y., assignor to Federal Telephone and Radio Corporation, New York, N. Y., a corporation of Delaware Application May 17, 1945, Serial No. 594,247

1 Claim. (Cl. 175—366)

This invention relates to rectifier units of the dry contact or metallic type and more particularly to multiple plate or stack assembled units such as selenium plate rectifiers for full wave rectification.

An object of the present improvements is to produce a simplified multiplate unit designed to possess important advantages and more successfully to meet the requirements of small capacity units of the types generally known as instrument rectifiers and employed for D.-C. operation of dial indicators or meters. In the achievement of its object, features and advantages of the improved device include, simplification of form and reduction in number of parts for economy in production, reduction in size and weight of its parts and elimination of screws or separate attaching means. It is further adapted for high efficiency including operational advantages occurring from absence of direct holding pressures applied to the electrode or active surfaces with corresponding reduction in electrical breakdown, the employment of maximum surface areas of the plates for rectification and an improved degree of electrical stability lessening the affect on the calibration by variations of current.

The referred to and other features and advantages of the invention will be understood by reference to the accompanying drawing wherein like reference characters are applied to the corresponding parts in the several views.

Figure 1:
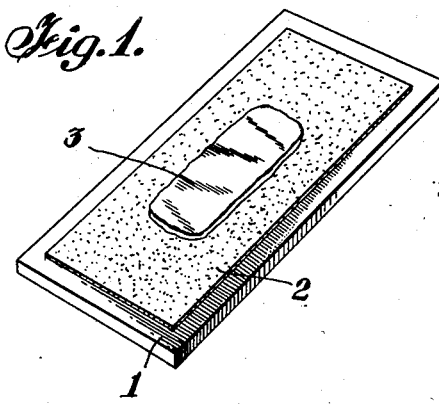
Fig. 1 is an enlarged view in perspective of one of the rectifier elements with a portion broken away.
Figure 3:
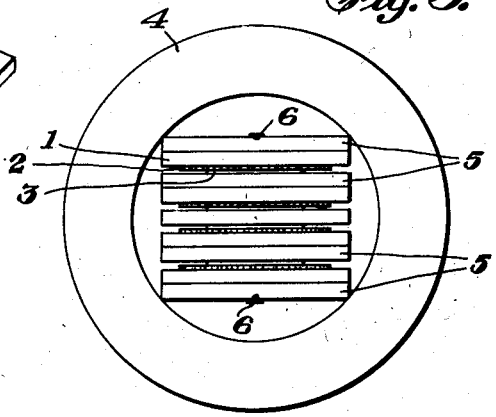
Fig. 3 is an end view thereof.
Figure 2:
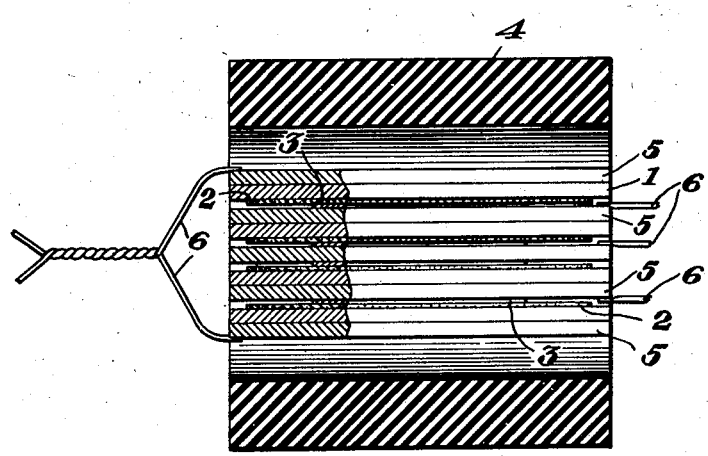
Fig. 2 is a central, vertical and longitudinal sectional view of a rectifier made in accordance with the invention, drawn to the same scale as Fig. 1.

In the preferred structure of the invention as here shown, the rectifier unit is composed of a stack assembly of selenium rectifier elements within a protective insulating and supporting casing of tubular formation. Each of the rectifier elements is composed of a carrier electrode plate I of steel or aluminum, upon which is applied an adherent layer 2 of selenium and over which is applied or sprayed the usual counter-electrode layer of Wood's alloy 3. In the customary manner the selenium layer is pressure and heat treated for crystallization and the completed element may be electroformed to produce an effective barrier layer between the selenium and counter-electrodes for high degree rectification.

The rectifier elements of the present structure are as shown of rectilinear form with the selenium coextensive and applied to substantially the entire surface area of the carrier plate electrode. The counter-electrode layer may be of reduced size as illustrated, depending upon the rectifying area desired.

In accordance with the invention, these rectifier elements are incorporated in stack assembly within a protective casing or enclosure composed of a tubular section 4 of insulating material such as insulating fibre or plastic. The stack assembly of rectifier elements has included therewith terminal or contact plates 5 to each of which is welded a circuit lead connection 6. The terminal plates are desirably of similar size and rectangular form to that of the carrier plates of the rectifier elements and are of any suitable conducting metal.

The assembling of the rectifier stack including its terminal plates within the open ended tubular casing 4 is as shown with the electrode faces of the rectifier elements parallel to the longitudinal axis of the cylindrical case. The relative dimensions of the stack assembly and the tubular casing are such that in the assembling of the parts the stack will be a close fit requiring forced insertion of the stack. In this operation the end terminal plates will, to a slight degree, cut into the inner cylindrical wall surface of the insulating casing. As the result, upon the insertion of the rectifier stack, the elements thereof will be retained in close pressure engagement so as to provide the close surface engagement or contact required for good electrical conductivity.

Figure 4:
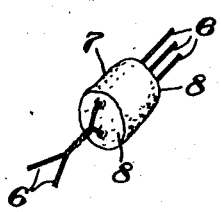
Fig. 4 is a perspective view of the completed assembly with a protective lacquer applied and shown in full size.
Figure 5:
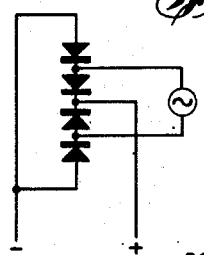
Fig. 5 is a diagram for full wave rectification.

In the disclosed structure the rectifying elements and associated terminal plates and leads are arranged for full-wave rectification although it will be obvious to those skilled in this art that the structural arrangement lends itself, as well, to multi-element half-wave rectifiers. To this end the rectifier stack consists of four rectifier elements positioned between outermost terminal plates and having terminal plates interposed between each of the rectifier elements, in accordance with the usual bridging circuit arrangement. As diagrammatically illustrated in Fig. 5 the rectifier plates at each side of the central axis are directed inwardly or in opposite direction toward the central terminal plate which is connected to the positive output lead; the outermost terminal plates have their wires connected by welding to provide the negative output lead and the intermediate terminal plates are connected to the respective leads of the A.-C. input circuit. In the structural arrangement as here shown the connected wires of the negative lead are extended from one end of the tube and the three wires comprising the central positive output leads and the A.-C. input leads are extended from the opposite end of the tubular casing in spaced relation. With the parts so assembled the rectifier unit is completed by applying to it an adherent insulating paint 7 as for instance by dipping so as to fill in the spaces between the rectifier stack and the inner cylindrical surface of the tube and likewise to form the closing end walls 8 for sealing of the unit and to provide insulating support for the leads, as best shown in Fig. 4.

The described structure is of a design particularly adapted for small instrument rectifiers in that it is particularly compact and operates with a substantially full area of contact and rectification as related to the surface of the rectifier elements. It is moreover advantageous in providing a rectifier unit of cylindrical or cartridge type suited for use with lead support installation without danger of becoming damaged in handling for assembling or under conditions of maintenance work. It is further desirable in that it provides a durable sealed structure wherein the stack assembly is firmly secured or retained in its position with the absence of direct holding pressures applied to the active surfaces thereby to reduce electrical breakdown by destructive pressure on the rectifier material.

While there is described and shown a preferred embodiment of the features of the invention it will be understood that various modification may be made therein without departing from the scope of the invention as defined in the appending claim.

What is claimed is:

A dry selenium rectifier unit that comprises a plurality of rectangular base elements, each of said elements having thereon a semi-conductive layer of selenium with an overlying layer of metallic counter-electrode, said elements being arranged in superimposed stacked relationship, and an electrically insulative cylindrical tubular member around said stacked elements, having its axis parallel to the edge of each of said elements and having its interior surface in forced engagement with marginal portions only of the rectifier elements located at the ends of the stack along the edges thereof whereby the rectifier elements are pressed against each other to establish electrical connection therebetween.

DAVID VITROGAN.

REFERENCES CITED

The following references are of record in the file of this patent:

UNITED STATES PATENTS

| Number | Name | Date |
| --- | --- | --- |
| 1,774,455 | Ruben | Aug. 26, 1930 |
| 1,866,351 | Hollnagel | July 5, 1932 |
| 2,117,020 | Conrad | May 10, 1938 |
| 2,217,471 | Conrad | Oct. 8, 1940 |
| 2,243,573 | Murphy | May 27, 1941 |
| 2,314,104 | Richards | Mar. 16, 1943 |
| 2,383,735 | Ray | Aug. 28, 1945 |